UNITED STATES PATENT OFFICE

GEORGE H. LILLEY, OF NO. 24 BROUGHTON ROAD, STOKE NEWINGTON, COUNTY OF MIDDLESEX, ENGLAND.

IMPROVEMENT IN THE MANUFACTURE OF POROUS BLOCKS FOR EFFECTING COMBUSTION OF HYDROCARBONS.

Specification forming part of Letters Patent No. 216,196, dated June 3, 1879; application filed April 10, 1879; patented in England, September 26, 1878.

*To all whom it may concern:*

Be it known that I, GEORGE HENRY LILLEY, of No. 24 Broughton Road, Stoke Newington, in the county of Middlesex, England, have invented an Improved Manufacture of Porous Blocks for Effecting Combustion of Hydrocarbons; and do hereby declare that the following description forms a full and exact specification of the same, wherein I have set forth the nature and principles of my said improvements, by which my invention may be distinguished from others of a similar class, together with such parts as I claim and desire to secure by Letters Patent—that is to say:

My invention relates to the manufacture of porous blocks of refractory material, which can be saturated with liquid hydrocarbons, such as oils, or with solid hydrocarbons, such as paraffine liquefied by heat, so that when a light is applied the hydrocarbon will burn, and afterward the block can be again saturated and so used in the same way many times in succession. I manufacture these blocks by intimately mixing refractory clay and a little sand with finely-divided carbonaceous or vegetable matter, such as fine sawdust or powdered charcoal, and with sufficient water to give cohesion to the mass. I mold this compound into blocks of the shape desired, preferably spherical, or approximately so, dry them, and then bake or burn them as bricks are burned, the effect of the burning being to consume the carbonaceous ingredients and render the block porous throughout its structure.

The proportions of the ingredients may be varied within certain limits. Practically, I find the following proportions suitable: fire-clay, or fire-clay mixed with about twenty-five per cent. of pipe-clay, sixty parts; sand, one part; and sawdust, eighteen parts.

Blocks made as I have described and soaked with hydrocarbon are conveniently applicable for lighting or kindling fires to burn other fuel; or the hydrocarbon with which these blocks are soaked may be used exclusively as the fuel, or for the purposes of illumination, and thus liquid hydrocarbons, the burning of which is usually attended with difficulties, are rendered available for heating purposes.

Having thus described the nature of my said invention, and the best means I know of carrying it into practical operation, I would have it understood that I make no general claim to the rendering of ceramic materials porous by their admixture before burning with carbonaceous matter, as has been proposed for making artificial millstones; but

I claim—

1. The manufacture of porous refractory blocks applicable for the burning of hydrocarbons, with which they are saturated, by forming a compound consisting chiefly of argillaceous and carbonaceous materials, molding the compound into blocks, drying and burning the same, substantially as herein described.

2. As a new article of manufacture, a porous refractory block saturated with hydrocarbon, for use as a fire-kindler.

In testimony whereof I have signed my name to this specification, in the presence of two subscribing witnesses, this 28th day of March, 1879.

GEO. H. LILLEY.

Witnesses:
CHAS. D. ABEL,
JNO. P. M. MILLARD.